United States Patent
Stammen

(10) Patent No.: US 7,664,565 B2
(45) Date of Patent: Feb. 16, 2010

(54) METHOD FOR COMPENSATING WEAR OF A FINISHING TOOL

(75) Inventor: Oliver Stammen, Radevormwald (DE)

(73) Assignee: Thielenhaus Microfinish Corp., Novi, MI (US)

( * ) Notice: Subject to any disclaimer, the term of this patent is extended or adjusted under 35 U.S.C. 154(b) by 208 days.

(21) Appl. No.: 11/725,842

(22) Filed: Mar. 20, 2007

(65) Prior Publication Data
US 2009/0018694 A1    Jan. 15, 2009

(51) Int. Cl.
G05B 19/18    (2006.01)

(52) U.S. Cl. .......................... 700/175; 409/80; 409/84; 409/131; 409/186

(58) Field of Classification Search .................. 700/175; 409/80, 84, 131, 186
See application file for complete search history.

(56) References Cited

U.S. PATENT DOCUMENTS

| | | | | |
|---|---|---|---|---|
| 4,249,243 A | * | 2/1981 | Yoshida et al. .............. | 700/175 |
| 4,428,055 A | * | 1/1984 | Zurbrick et al. ............. | 700/160 |
| 5,163,009 A | * | 11/1992 | Yamane ....................... | 700/169 |
| 6,225,589 B1 | * | 5/2001 | Bartok ..................... | 219/69.15 |
| 7,331,739 B2 | * | 2/2008 | Yoshida et al. .............. | 409/131 |
| 2006/0251484 A1 | * | 11/2006 | Yoshida et al. .............. | 409/131 |

\* cited by examiner

*Primary Examiner*—Albert DeCady
*Assistant Examiner*—Douglas S Lee
(74) *Attorney, Agent, or Firm*—VanOphem & VanOphem, P.C.

(57) ABSTRACT

The invention is a method of creating greater accuracies for wear compensation of a finishing tool during the finishing of workpieces, in which a reference surface is ablated by initially traversing the finishing tool over the reference surface and determining the actual wear of the finishing tool as a result of this initial feed motion of the finishing tool controlled by an NC feed program of an NC machine. The actual measured wear of the finishing tool as a result of the initial traversing feed motion over the reference surface is compared to a known empirical wear trend line for the workpiece and the feed motion of the NC feed program for the next workpiece is recalculated as a function of the comparative actual wear of the finish tool with respect to the known empirical wear trend line.

16 Claims, 1 Drawing Sheet

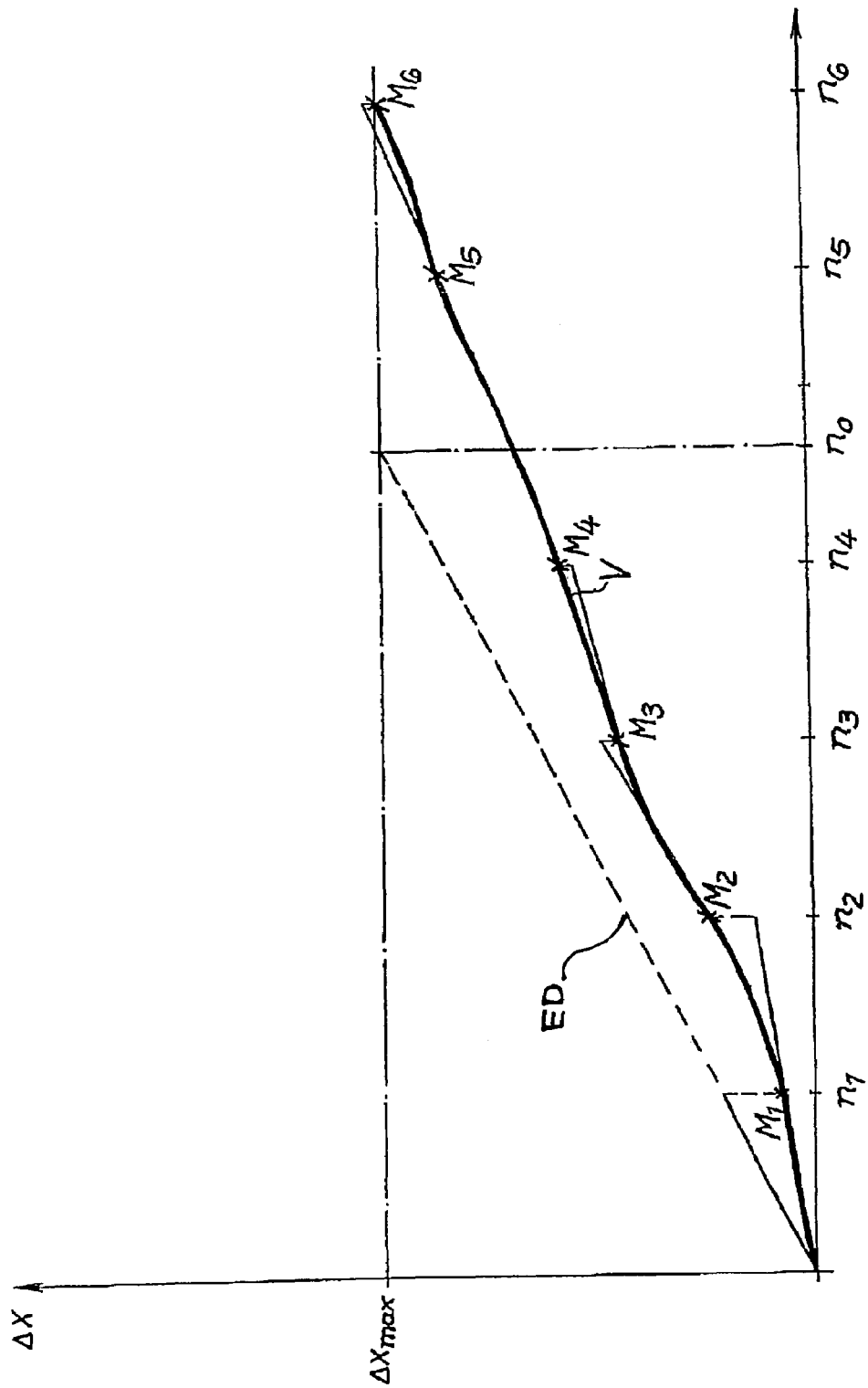

METHOD FOR COMPENSATING WEAR OF A FINISHING TOOL

CROSS REFERENCE TO RELATED APPLICATIONS

This application claims priority to German Patent Application No. 102006019135.8-32 that was filed on Apr. 21, 2006.

FEDERALLY SPONSORED RESEARCH OR DEVELOPMENT

Not applicable.

REFERENCE TO SEQUENCE LISTING

Not applicable.

BACKGROUND OF THE INVENTION

1. Field of the Invention

The invention relates to a method for compensating for wear of a finishing tool in the finish machining of workpieces, in which a reference surface layer of the workpiece is removed by a feed motion of the finishing tool controlled by an NC feed program, wherein the NC feed program re-calculates the feed path for the next workpiece by comparing the actual wear of the prior workpiece to a known empirical wear trend line and compensates through an adjustment of the feed motion of the NC feed program.

2. Description of the Related Prior Art

Finish machining of a workpiece corrects dimensional deviations and non-round regions of a workpiece and produces a smooth surface, which is distinguished through a low depth of roughness. The term "finishing work" includes, in particular, fine grinding and honing methods. Finishing tools can include, for example, abrasive belts, honing stones, rotating grinding cup wheels, and the like. The suitable finishing tool is selected according to the workpiece to be processed. Workpieces can include, for example, brake disks, connecting rods, crankshafts and camshafts, toothed racks, gears, anti-friction bearings, also medical prosthetics and workpieces made from ceramic, glass, or plastic.

The finish machining is performed through a relative motion between a workpiece surface and a finishing tool, wherein the relative motion can be divided into a motion essentially parallel to a surface of the workpiece and a feed motion between the workpiece and finishing tool. By controlling the feed motion, a given workpiece dimension can be achieved, wherein, however, a change in the finishing tool, due to wear, is to be taken into account. The relative motion between the finishing tool and the workpiece surface can be achieved by driving the finishing tool and/or the workpiece.

A method for compensating wear with the features described above is known in the prior art. In this prior art method, wear of the finishing tool is extrapolated with reference to a typical empirical wear trend starting from a new finishing tool, and the feed motion is adjusted accordingly by the NC feed program. Because irregularities in the quality of the finishing tool and workpiece are not taken into account at first, the wear compensation is imprecise, wherein systematic deviations add up over the entire service life of the finishing tool. After finish machining, the wear trend can be checked with reference to an exact measurement of the workpieces and adjusted if necessary. As long as the measurement is performed directly after the finish machining, the wear trend for a specific finishing tool can also be checked during operation and, if necessary, corrected. The realization of such post-process measurement control, however, is relatively complicated, time consuming, and expensive.

From experience, it is further known to determine the wear of the finishing tool directly during the finish machining, for example, with a measurement sensor, and to adjust the feed motion as a function of measurement sensor reading by means of the NC feed program. For precise consideration of the wear determined by the measurement sensor, a very low workpiece tolerance can be achieved, wherein the described in-process measurement control is complicated and very expensive.

BRIEF SUMMARY OF THE INVENTION

The invention is based on the task of refining a method for compensating wear with the features described above such that greater accuracy of the wear compensation for a finishing tool can be achieved in a simple way.

The task is accomplished according to the invention by measuring the wear of the finishing tool by traversing a reference surface according to a feed path, wherein the empirical wear trend is known and referenced to the actual measured wear. The reference surface can be provided by a reference workpiece. By traversing the reference surface between the processing of two workpieces or during a pause in the processing of one workpiece, the wear of the finishing tool is measured exactly. In addition, the actual empirical wear trend of the present finishing tool can be determined and adjusted accordingly, starting from the dimensions of the finishing tool in the new state or the wear determined in a preceding traversal of the reference surface. By traversing the reference surface several times over the service life of a certain finishing tool, a wear trend, changing with advancing wear, is determined and adjusted accordingly. If the exact dimensions of a new finishing tool are not known exactly, before the start of processing of the workpieces with the new finishing tool, it is preferably provided that the reference surface is traversed for precise determination of the dimensions of the finishing tool. In comparison to an expensive and complicated in-process measurement control that requires the use of tactile measurement devices, the method according to the invention is distinguished in that it is also to be used without restriction for small workpiece dimensions, in bores, or at a high degree of coverage of the finishing tool and the surface to be processed, wherein very tight workpiece tolerances can be achieved in the micrometer range.

In a first, especially easy to realize construction of the invention, it is provided that the reference surface is traversed at fixed intervals, for example, after a given number of processed workpieces. In an alternative construction of the method according to the invention, it is provided that the reference surface is traversed at variable intervals as a function of the empirical wear trend and the actual realized wear. In particular, for a new finishing tool, shortly before reaching a given wear limit or with an unexpectedly strong change in the wear trend, short intervals for traversing the reference surface are advantageous. If the wear trend changes only slightly over successive measurements of wear, a long interval for traversing the reference surface is sufficient.

Because the wear and thus also the attainment of a given wear limit can be determined exactly with the method according to the invention, optimal use of each finishing tool is guaranteed, wherein quick wear is indicated in due time before the surface quality decreases due to processing with a worn-off finishing tool and wherein for slow wear, the finishing tool can be used over a longer time period until reaching the wear limit. Preferably, the remaining service life of the finishing tool is determined from the measured wear and the wear trend and transmitted to a process-visualization tool. It can be indicated to a user of the method according to the invention when the finishing tool is to be changed. Also, automatic tool change when the wear limit is reached is possible within the scope of the present invention.

BRIEF DESCRIPTION OF THE DRAWINGS

The invention is disclosed below with reference to a drawing showing only a preferred embodiment. FIG. 1 shows, as an example, the method according to the invention for compensating wear of a finishing tool.

DETAILED DESCRIPTION OF THE PREFERRED EMBODIMENT

Before beginning to process workpieces with a new finishing tool, for determining the exact dimensions of the finishing tool, a reference net surface, which may be provided by a reference workpiece, is traversed, and the zero or starting point for an NC feed program is set. Starting from this value, the reduction in the dimensions of the finishing tool in the feed direction $\Delta x$ is calculated in advance based on empirical wear trend data, wherein the feed wear path between the finishing tool and the workpiece in the x-direction initially increases continuously so as to compensate for wear of the finishing tool. This is shown in FIG. 1 by dash line ED. Starting from the basic empirical wear trend, it is expected that the wear limit $\Delta x_{max}$ will be reached after processing $n_0$ workpieces. After finish machining $n_1$ workpieces, the reference workpiece is traversed for the first time and the actual wear of the finishing tool during the traversing is measured in a first measurement $M_1$. Because the measured wear is less than that calculated in advance from the empirical data, for the further processing, a lower actual wear trend is determined. Consequently, as shown in FIG. 1, the actual wear V is programmed to increase, for the second traversal of the reference workpiece in measurement $M_2$ after $n_2$ workpieces, a steeper actual wear trend line is experienced. For further measurements $M_3$ and $M_4$ after $n_3$ and $n_4$ workpieces, respectively, because only small corrections of the wear trend are experienced, a greater interval until measurement $M_5$ after $n_5$ workpieces is selected by the NC feed program after measurement $M_4$. Starting from the measured wear and the determined wear trend, the remaining service life of the finishing tool is always determined and transmitted to a process-visualization tool. After finish machining $n_6$ workpieces, the given wear limit $\Delta x_{max}$ is reached and the finishing tool must be changed. A corresponding status report is displayed to a user on a process-visualization tool.

What is claimed is:

1. A method for compensating for wear of a finishing tool in the finishing work of workpieces, in which a reference surface of a workpiece is ablated by a feed motion of said finishing tool controlled by an NC feed program, said method comprising the steps of:

provide a reference work surface;
traverse said reference work surface with a new finishing tool to establish a reference starting point or zero (0) point for said NC feed program; and
the NC feed program measures the actual wear of said finishing tool as a function of an empirical wear trend after finishing a first workpiece and compensates for the difference between actual wear and empirical wear of said finishing tool on a subsequent workpiece by adjusting the feed motion of said NC feed program, said actual wear of said finishing tool being determined by traversing said reference surface and measuring said actual wear.

2. The method as claimed in claim 1 wherein said reference surface is provided by a reference workpiece.

3. The method as claimed in claim 1 wherein the remaining service life of said finishing tool is determined from the actual measured wear and transmitted to a process-visualization tool.

4. The method as claimed in claim 1 wherein said reference surface is traversed between the processing of consecutive workpieces.

5. The method as claimed in claim 1 wherein said reference surface is traversed after an interruption in the processing of a workpiece.

6. The method as claimed in claim 1 wherein said reference surface is traversed before the beginning of the processing of workpieces with a new finishing tool.

7. The method for compensating for wear of a finishing tool as claimed in claim 1 wherein said reference surface is traversed multiple times at fixed preset intervals to determine the actual wear of said finishing tool, and wherein said actual wear is compared to said empirical wear trend at variable intervals over the service life of said finishing tool.

8. The method as claimed in claim 1 wherein said wear of said finishing tool is measured by each traversal of said reference surface and compared to said empirical wear trend to adjust said feed motion of said NC feed program.

9. A method for compensating for wear of a finishing tool in the finish machining of workpieces, in which a reference surface is ablated by a feed motion of said finishing tool controlled by an NC feed program, said method comprising the steps of:

providing a reference work surface;
traversing said reference work surface with a new finishing tool to establish a reference starting point for said NC feed program of an NC machine;
measure the actual wear of said new finishing tool after said traversing step and based on empirical wear data determine an empirical wear trend line based on said measured actual wear measurement of said new finishing tool;
traverse a first workpiece and measure the actual wear of said new finishing tool;
compare said actual wear of said new finishing tool with said empirical wear trend line for said new finishing tool; and
adjust said feed motion of said NC feed program of said NC machine as a function of said comparing step to process the next workpiece.

10. The method as claimed in claim 9 wherein said comparing step is repeated for each workpiece.

11. The method as claimed in claim 9 wherein said comparing step is used to determine the remaining service life of said finishing tool and transmitted to a process-visualization tool.

12. The method as claimed in claim 9 wherein said reference surface is provided by a reference workpiece.

13. The method as claimed in claim 9 wherein said reference surface is traversed between the processing of consecutive workpieces.

14. The method as claimed in claim 9 wherein said reference surface is traversed after an interruption in the processing of said workpiece.

15. The method as claimed in claim 9 wherein said reference surface is traversed before the beginning of the processing of said workpieces with said new finishing tool.

16. A method for compensating for wear of a finishing tool in the finishing work of workpieces, in which a reference surface of a workpiece is ablated by a feed motion of said finishing tool controlled by an NC feed program, said method comprising the step of:

traverse said reference surface before beginning processing of workpieces with a new finishing tool thereby establishing the point or zero (0) point for the NC feed program;

calculate the reduction of the finishing tool in a first feed direction $\Delta_x$ to finish machine a first workpiece $n_1$ based on empirical wear trend data having a wear limit of $\Delta_x$max;

processing a first workpiece $n_1$ using said calculated reduction in said NC feed program during said processing;

traverse said reference surface after processing said first workpiece $n_1$ and measure the actual wear $M_1$ of said finishing tool;

compare said actual wear $M_1$ of said finishing tool to the empirical data wear $ED_1$ for said first workpiece $n_1$; and for further processing of additional work pieces ($n_2$, $n_3$, $n_4$, etc. . . . ) reset said NC feed program to compensate for the difference between said actual wear $M_1$ and the empirical data wear $ED_1$ for said prior workpiece whereby said NC feed program is reset to increase wear if said actual wear for said prior workpieces is less than said empirical data wear $ED_n$ and further such that said NC feed program is reset to decrease wear of said finishing tool if said actual wear for said finishing tool is greater than said empirical data wear $ED_n$.

* * * * *